United States Patent
Kaliski, Jr.

(10) Patent No.: US 10,680,806 B1
(45) Date of Patent: Jun. 9, 2020

(54) DNS-BASED SYMMETRIC-KEY INFRASTRUCTURE

(71) Applicant: VERISIGN, INC., Reston, VA (US)

(72) Inventor: Burton S. Kaliski, Jr., McLean, VA (US)

(73) Assignee: VERISIGN, INC., Reston, VA (US)

( * ) Notice: Subject to any disclaimer, the term of this patent is extended or adjusted under 35 U.S.C. 154(b) by 110 days.

(21) Appl. No.: 15/792,457

(22) Filed: Oct. 24, 2017

(51) Int. Cl.
| | |
|---|---|
| *H04L 9/26* | (2006.01) |
| *H04L 9/08* | (2006.01) |
| *H04L 9/14* | (2006.01) |
| *H04L 29/12* | (2006.01) |
| *H04L 29/06* | (2006.01) |
| *H04L 9/32* | (2006.01) |

(52) U.S. Cl.
CPC ............. *H04L 9/083* (2013.01); *H04L 9/14* (2013.01); *H04L 9/3226* (2013.01); *H04L 61/1511* (2013.01); *H04L 63/0435* (2013.01)

(58) Field of Classification Search
CPC ......... H04L 9/083; H04L 9/14; H04L 9/3226; H04L 61/1511; H04L 63/0435
See application file for complete search history.

(56) References Cited

U.S. PATENT DOCUMENTS

| | | |
|---|---|---|
| 4,386,233 A | 5/1983 | Smid et al. |
| 4,850,017 A | 7/1989 | Matyas, Jr. et al. |
| 6,889,321 B1* | 5/2005 | Kung ................ H04L 29/06027 348/E7.056 |
| 8,532,303 B2 | 9/2013 | Sunder et al. |
| 2003/0070067 A1* | 4/2003 | Saito .................... H04L 63/0435 713/150 |
| 2008/0019526 A1* | 1/2008 | Fu ......................... H04L 9/0822 380/277 |
| 2010/0325423 A1* | 12/2010 | Etchegoyen ........ H04L 63/0428 713/153 |
| 2012/0011360 A1 | 1/2012 | Engels et al. |
| 2017/0093802 A1 | 3/2017 | Norum et al. |
| 2017/0359323 A1* | 12/2017 | Weis ...................... H04L 67/16 |

OTHER PUBLICATIONS

R. Atkinson, "Key Exchange Delegation Record for the DNS", IETF RFC 2230, Nov. 1997, pp. 1-11.

(Continued)

*Primary Examiner* — Baotran N To
(74) *Attorney, Agent, or Firm* — MH2 Technology Law Group, LLP

(57) ABSTRACT

Techniques for distributing a symmetric key using the Domain Name System (DNS) are presented. The techniques can include receiving, at a first key server and from a first computer, a request for first information sufficient for the first computer to obtain, and second information sufficient for a second computer to obtain, a symmetric key for securing at least one communication sent from the first computer to the second computer, and providing, by the first key server and to the first computer, the first information and the second information, such that the first computer secures at least one communication sent from the first computer to the second computer using at least the symmetric key for securing at least one communication sent from the first computer to the second computer.

28 Claims, 3 Drawing Sheets

(56) References Cited

OTHER PUBLICATIONS

ISO 8732:1988 (E). Banking—Key management (Wholesale). International Organization for Standardization, Nov. 15, 1988, pp. 1-90.
ANSI X9.102-2008 (R2017). Symmetric Key Cryptography for the Financial Services Industry—Wrapping of Keys and Associated Data. American National Standards Institute, 2008 (revised 2017), pp. 1-43.
Barker et al., "Recommendation for Pair-Wise Key Establishment Schemes Using Discrete Logarithm Cryptography", NIST Special Publication 800-56A Revision 2, May 2013, pp. 1-127.
Morris Dworkin, "Recommendation for Block Cipher Modes of Operation: Methods for Key Wrapping", NIST Special Publication 800-38F, Dec. 2012, pp. 1-32.
J. Kohl et al., "The Kerberos Network Authentication Service (V5)", IETF RFC 1510, Sep. 1993, pp. 1-112.
H. Krawczyk et al., "HMAC-based Extract-and-Expand Key Derivation Function (HKDF)", IETF RFC 5869, May 2010, pp. 1-14.
H. Krawczyk et al., "The OPTLS Protocol and TLS 1.3" 2016 IEEE European Symposium on Security and Privacy (EuroS&P), Mar. 2016, pp. 1-27.
Stephen M. Matyas, "Key processing with control vectors", Journal of Cryptology, Vol_ 3, Issue 2, Jan. 1991, pp. 113-136.
Matyas et al., "Generation, distribution, and installation of cryptographic keys", IBM Systems Journal, vol. 17, Issue 2, 1978, pp. 126-137.
NIST, FIPS 171: Key Management Using ANSI X9.17, Apr. 27, 1992, Retrieved from the Internet: http://securityv.isu.edu/isl/fips171.html, pp. 1-26.
NIST, "AES Key Wrap Specification", Nov. 16, 2001, pp. 1-23.
J. Salowey et al., "Transport Layer Security (TLS) Session Resumption without Server-Side State", IETF RFC 5077, Jan. 2008, pp. 1-20.
Miles E. Smid, "Computer Science & Technology: a Key Notarization System for Computer Networks", National Bureau of Standards Special Publication 500-54, 1979, pp. 1-40.
E. Rescorla, "The Transport Layer Security (TLS) Protocol Version 1.3", Jul. 3, 2017, Retrieved from the Internet: https://tools.ietf.org/pdf/draft-ietf-tls-tls13-21.pdf, pp. 1-143.
U.S. Office Action issued in corresponding U.S. Appl. No. 16/231,095 dated Oct. 3, 2019, pp. 1-15.
Neuman et al., The Kerberos Network Authentication Service (V5), Network Working Group, Request for Comments: 4120, Standards Track, Jul. 2005, pp. 1-138.

\* cited by examiner

DNS-BASED SYMMETRIC-KEY INFRASTRUCTURE

FIELD

This disclosure relates generally to internet security.

BACKGROUND

The domain name system (DNS) is a hierarchical distributed naming system for resources provided by computer servers that are connected to the internet. It associates domain names to numeric internet protocol (IP) addresses of internet resources, including resources managed by web hosting providers, which provide the web server computers that serve the web pages associated with domain names. The DNS thus allows computers and humans to access networked resources, including web pages, using names.

SUMMARY

According to various embodiments, a method of distributing a symmetric key using the Domain Name System (DNS) is presented. The method includes receiving, at a first key server and from a first computer, a request for first information sufficient for the first computer to obtain, and second information sufficient for a second computer to obtain, a symmetric key for securing at least one communication sent from the first computer to the second computer; requesting, by the first key server, and from the DNS, a DNS resource record identifying a second key server for the second computer; requesting, by the first key server and from the second key server, third information sufficient for the first key server to construct the first information sufficient for the first computer to obtain, and the second information sufficient for the second computer to obtain, the symmetric key for securing at least one communication sent from the first computer to the second computer; obtaining, by the first key server and from the second key server, the third information sufficient for the first key server to construct the first information sufficient for the first computer to obtain, and the second information sufficient for the second computer to obtain, the symmetric key for securing at least one communication sent from the first computer to the second computer; and providing, by the first key server and to the first computer, the first information sufficient for the first computer to obtain, and the second information sufficient for the second computer to obtain, the symmetric key for securing at least one communication sent from the first computer to the second computer. As a result, the first computer secures at least one communication sent from the first computer to the second computer using at least the symmetric key for securing at least one communication sent from the first computer to the second computer.

Various optional features of the above embodiments include the following. The third information sufficient for the first key server to construct the first information sufficient for the first computer to obtain, and the second information sufficient for the second computer to obtain, the symmetric key for securing at least one communication sent from the first computer to the second computer may include the second information sufficient for the second computer to obtain, and fourth information sufficient for the first key server to obtain, the symmetric key for securing at least one communication sent from the first computer to the second computer, and the method may further include: computing, by the first key server, the symmetric key for securing at least one communication sent from the first computer to the second computer from the fourth information sufficient for the first key server to obtain the symmetric key for securing at least one communication sent from the first computer to the second computer; and constructing, by the first key server, the first information sufficient for the first computer to obtain the symmetric key for securing at least one communication sent from the first computer to the second computer. The third information sufficient for the first key server to construct the first information sufficient for the first computer to obtain, and the second information sufficient for the second computer to obtain, the symmetric key for securing at least one communication sent from the first computer to the second computer may include fifth information sufficient for the first key server to obtain, and sixth information sufficient for the second computer to obtain, a symmetric key for securing at least one communication sent from the first key server to the second computer via the first computer, and the method may further include: computing, by the first key server, the symmetric key for securing at least one communication sent from the first key server to the second computer via the first computer from the fifth information sufficient for the first key server to obtain the symmetric key for securing at least one communication sent from the first key server to the second computer via the first computer; preparing, by the first key server, the symmetric key for securing at least one communication sent from the first computer to the second computer; constructing, by the first key server, the first information sufficient for the first computer to obtain the symmetric key for securing at least one communication sent from the first computer to the second computer; and constructing, by the first key server, seventh information sufficient for the second computer to obtain the symmetric key for securing at least one communication sent from the first computer to the second computer given the symmetric key for securing at least one communication sent from the first key server to the second computer via the first computer; where the second information sufficient for the second computer to obtain the symmetric key for securing at least one communication sent from the first computer to the second computer includes the sixth information sufficient for the second computer to obtain the symmetric key for securing at least one communication sent from the first key server to the second computer via the first computer and the seventh information sufficient for the second computer to obtain the symmetric key for securing at least one communication sent from the first computer to the second computer given the symmetric key for securing at least one communication sent from the first key server to the second computer via the first computer. The method may include storing, by the first key server, the sixth information sufficient for the second computer to obtain the symmetric key for securing at least one communication sent from the first key server to the second computer via the first computer; receiving, at the first key server and from a third computer, a request for eighth information sufficient for the third computer to obtain, and ninth information sufficient for the second computer to obtain, a symmetric key for securing at least one communication sent from the third computer to the second computer; and providing, by the first key server and to the third computer, at least the sixth information sufficient for the second computer to obtain the symmetric key for securing at least one communication sent from the first key server to the second computer. The constructing the first information and the constructing the seventh information may be performed within a tamper resistant hardware cryptographic module. The requesting, by the first key server, and from the DNS, a DNS resource record identifying a second key server for the second computer may include interacting with multiple DNS name servers in a portion of a DNS hierarchy. The constructing, by the first key server, the first information sufficient for the first computer to obtain the symmetric key for securing at least one communication sent from the first computer to the second computer, may include wrapping the symmetric key for securing at least one communication sent from the first computer to the second computer using a symmetric key for securing at least one communication sent from the first key server to the first computer, and the first information sufficient for the first computer to obtain the symmetric key for securing at least one communication sent from the first computer to the second computer may include the wrapped key; such that the first computer obtains the symmetric key for securing at least one communication sent from the first computer to the second computer by unwrapping the wrapped key using the symmetric key for securing at least one communication sent from the first key server to the first computer. The constructing, by the first key server, the seventh information sufficient for the second computer to obtain the symmetric key for securing at least one communication sent from the first computer to the second computer given the symmetric key for securing at least one communication sent from the first key server to the second computer via the first computer, may include wrapping the symmetric key for securing at least one communication sent from the first computer to the second computer using the symmetric key for securing at least one communication sent from the first key server to the second computer via the first computer, and the seventh information sufficient for the second computer to obtain the symmetric key for securing at least one communication sent from the first computer to the second computer given the symmetric key for securing at least one communication sent from the first key server to the second computer via the first computer may include the wrapped key; such that the second computer obtains the symmetric key for securing at least one communication sent from the first computer to the second computer by unwrapping the wrapped key using the symmetric key for securing at least one communication sent from the first key server to the second computer via the first computer. The preparing, by the first key server, the symmetric key for securing at least one communication sent from the first computer to the second computer, may include deriving the symmetric key for securing at least one communication sent from the first computer to the second computer from a symmetric key for securing at least one communication sent from the first key server to the first computer and at least one key derivation parameter, and the first information sufficient for the first computer to obtain the symmetric key for securing at least one communication sent from the first computer to the second computer may include the at least one key derivation parameter; such that the first computer derives the symmetric key for securing at least one communication sent from the first computer to the second computer from the symmetric key for securing at least one communication sent from the first key server to the first computer and the at least one key derivation parameter. The preparing, by the first key server, the symmetric key for securing at least one communication sent from the first computer to the second computer, may include deriving the symmetric key for securing at least one communication sent from the first computer to the second computer from the symmetric key for securing at least one communication sent from the first key server to the second computer via the first computer and at least one key derivation parameter, and the seventh information sufficient for the second computer to obtain the symmetric key for securing at least one communication sent from the first computer to the second computer given the symmetric key for securing at least one communication sent from the first key server to the second computer via the first computer may include the at least one key derivation parameter; such that the second computer derives the symmetric key for securing at least one communication sent from the first computer to the second computer from the symmetric key for securing at least one communication sent from the first key server to the second computer via the first computer and the at least one key derivation parameter. The method may include requesting, by the first key server and from the DNS, a DNS resource record identifying a key server for the second key server; and obtaining, by the first key server and from the key server for the second key server, a symmetric key for securing at least one communication sent from the first key server to the second key server. The method may further include storing, by the second key server, a plurality of symmetric keys wrapped using a symmetric key for securing at least one communication between the second key server and the second computer. The first key server may be one of a plurality of key servers from which the first computer obtains a respective symmetric key for securing at least one communication sent from the first computer to the second computer, such that the first computer obtains an encryption symmetric key by combining the respective symmetric keys for securing at least one communication sent from the first computer to the second computer. The second computer may be a DNS server computer. The first key server may include a DNS name server.

According to various embodiments, a system for distributing a symmetric key using the Domain Name System (DNS) is disclosed. The system includes a first key server including at least one electronic hardware server computer communicatively coupled to the internet and configured to perform a method including: receiving, at the first key server and from a first computer, a request for first information sufficient for the first computer to obtain, and second information sufficient for a second computer to obtain, a symmetric key for securing at least one communication sent from the first computer to the second computer; requesting, by the first key server, and from the DNS, a DNS resource record identifying a second key server for the second computer; requesting, by the first key server and from the second key server, third information sufficient for the first key server to construct the first information sufficient for the first computer to obtain, and the second information sufficient for the second computer to obtain, the symmetric key for securing at least one communication sent from the first computer to the second computer; obtaining, by the first key server and from the second key server, the third information sufficient for the first key server to construct the first information sufficient for the first computer to obtain, and the second information sufficient for the second computer to obtain, the symmetric key for securing at least one communication sent from the first computer to the second computer; and providing, by the first key server and to the first computer, the first information sufficient for the first computer to obtain, and the second information sufficient for the second computer to obtain, the symmetric key for securing at least one communication sent from the first computer to the second computer. As a result, the first computer secures at least one communication sent from the first computer to the second computer using at least the symmetric key for securing at least one communication sent from the first computer to the second computer.

Various optional features of the above embodiments include the following. The third information sufficient for the first key server to construct the first information sufficient for the first computer to obtain, and the second information sufficient for the second computer to obtain, the symmetric key for securing at least one communication sent from the first computer to the second computer, may include the second information sufficient for the second computer to obtain, and fourth information sufficient for the first key server to obtain, the symmetric key for securing at least one communication sent from the first computer to the second computer; where the first key server is further configured to perform: computing the symmetric key for securing at least one communication sent from the first computer to the second computer from the fourth information sufficient for the first key server to obtain the symmetric key for securing at least one communication sent from the first computer to the second computer; and constructing the first information sufficient for the first computer to obtain the symmetric key for securing at least one communication sent from the first computer to the second computer. The third information sufficient for the first key server to construct the first information sufficient for the first computer to obtain, and the second information sufficient for the second computer to obtain, the symmetric key for securing at least one communication sent from the first computer to the second computer may include fifth information sufficient for the first key server to obtain, and sixth information sufficient for the second computer to obtain, a symmetric key for securing at least one communication sent from the first key server to the second computer via the first computer; where the first key server is further configured to perform: computing the symmetric key for securing at least one communication sent from the first key server to the second computer via the first computer from the fifth information sufficient for the first key server to obtain the symmetric key for securing at least one communication sent from the first key server to the second computer via the first computer; preparing the symmetric key for securing at least one communication sent from the first computer to the second computer; constructing the first information sufficient for the first computer to obtain the symmetric key for securing at least one communication sent from the first computer to the second computer; and constructing seventh information sufficient for the second computer to obtain the symmetric key for securing at least one communication sent from the first computer to the second computer given the symmetric key for securing at least one communication sent from the first key server to the second computer via the first computer; where the second information sufficient for the second computer to obtain the symmetric key for securing at least one communication sent from the first computer to the second computer includes the sixth information sufficient for the second computer to obtain the symmetric key for securing at least one communication sent from the first key server to the second computer via the first computer and the seventh information sufficient for the second computer to obtain the symmetric key for securing at least one communication sent from the first computer to the second computer given the symmetric key for securing at least one communication sent from the first key server to the second computer via the first computer. The first key server may be further configured to perform: storing the sixth information sufficient for the second computer to obtain the symmetric key for securing at least one communication sent from the first key server to the second computer via the first computer; receiving, from a third computer, a request for eighth information sufficient for the third computer to obtain, and ninth information sufficient for the second computer to obtain, a symmetric key for securing at least one communication sent from the third computer to the second computer; and providing, to the third computer, at least the sixth information sufficient for the second computer to obtain the symmetric key for securing at least one communication sent from the first key server to the second computer. The system may further include a tamper resistant hardware cryptographic module, where the constructing the first information and the constructing the seventh information is performed within a tamper resistant hardware cryptographic module. The requesting, from the DNS, a DNS resource record identifying a second key server for the second computer may include interacting with multiple DNS name servers in a portion of a DNS hierarchy. The constructing the first information sufficient for the first computer to obtain the symmetric key for securing at least one communication sent from the first computer to the second computer may include wrapping the symmetric key for securing at least one communication sent from the first computer to the second computer using a symmetric key for securing at least one communication sent from the first key server to the first computer, and the first information sufficient for the first computer to obtain the symmetric key for securing at least one communication sent from the first computer to the second computer may include the wrapped key; such that the first computer obtains the symmetric key for securing at least one communication sent from the first computer to the second computer by unwrapping the wrapped key using the symmetric key for securing at least one communication sent from the first key server to the first computer. The constructing the seventh information sufficient for the second computer to obtain the symmetric key for securing at least one communication sent from the first computer to the second computer given the symmetric key for securing at least one communication sent from the first key server to the second computer via the first computer, may include wrapping the symmetric key for securing at least one communication sent from the first computer to the second computer using the symmetric key for securing at least one communication sent from the first key server to the second computer via the first computer, where the seventh information sufficient for the second computer to obtain the symmetric key for securing at least one communication sent from the first computer to the second computer given the symmetric key for securing at least one communication sent from the first key server to the second computer via the first computer may include the wrapped key; such that the second computer obtains the symmetric key for securing at least one communication sent from the first computer to the second computer by unwrapping the wrapped key using the symmetric key for securing at least one communication sent from the first key server to the second computer via the first computer. The preparing the symmetric key for securing at least one communication sent from the first computer to the second computer may include deriving the symmetric key for securing at least one communication sent from the first computer to the second computer from a symmetric key for securing at least one communication sent from the first key server to the first computer and at least one key derivation parameter, where the first information sufficient for the first computer to obtain the symmetric key for securing at least one communication sent from the first computer to the second computer includes the at least one key derivation parameter; such that the first computer derives the symmetric key for securing at least one communication sent from the first computer to the second computer from the symmetric key for securing at least one communication sent from the first key server to the first computer and the at least one key derivation parameter. The preparing the symmetric key for securing at least one communication sent from the first computer to the second computer may include deriving the symmetric key for securing at least one communication sent from the first computer to the second computer from the symmetric key for securing at least one communication sent from the first key server to the second computer via the first computer and at least one key derivation parameter, where the seventh information sufficient for the second computer to obtain the symmetric key for securing at least one communication sent from the first computer to the second computer given the symmetric key for securing at least one communication sent from the first key server to the second computer via the first computer includes the at least one key derivation parameter; such that the second computer derives the symmetric key for securing at least one communication sent from the first computer to the second computer from the symmetric key for securing at least one communication sent from the first key server to the second computer via the first computer and the at least one key derivation parameter. The first key server may be further configured to perform: requesting, from the DNS, a DNS resource record identifying a key server for the second key server; and obtaining, from the key server for the second key server, a symmetric key for securing at least one communication sent from the first key server to the second key server. The second key server may be further configured to store a plurality of symmetric keys wrapped using a symmetric key for securing at least one communication between the second key server and the second computer. The first key server may be one of a plurality of key servers from which the first computer obtains a respective symmetric key for securing at least one communication sent from the first computer to the second computer, such that the first computer obtains an encryption symmetric key by combining the respective symmetric keys for securing at least one communication sent from the first computer to the second computer. The second computer may be a DNS server computer. The first key server may include a DNS name server.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
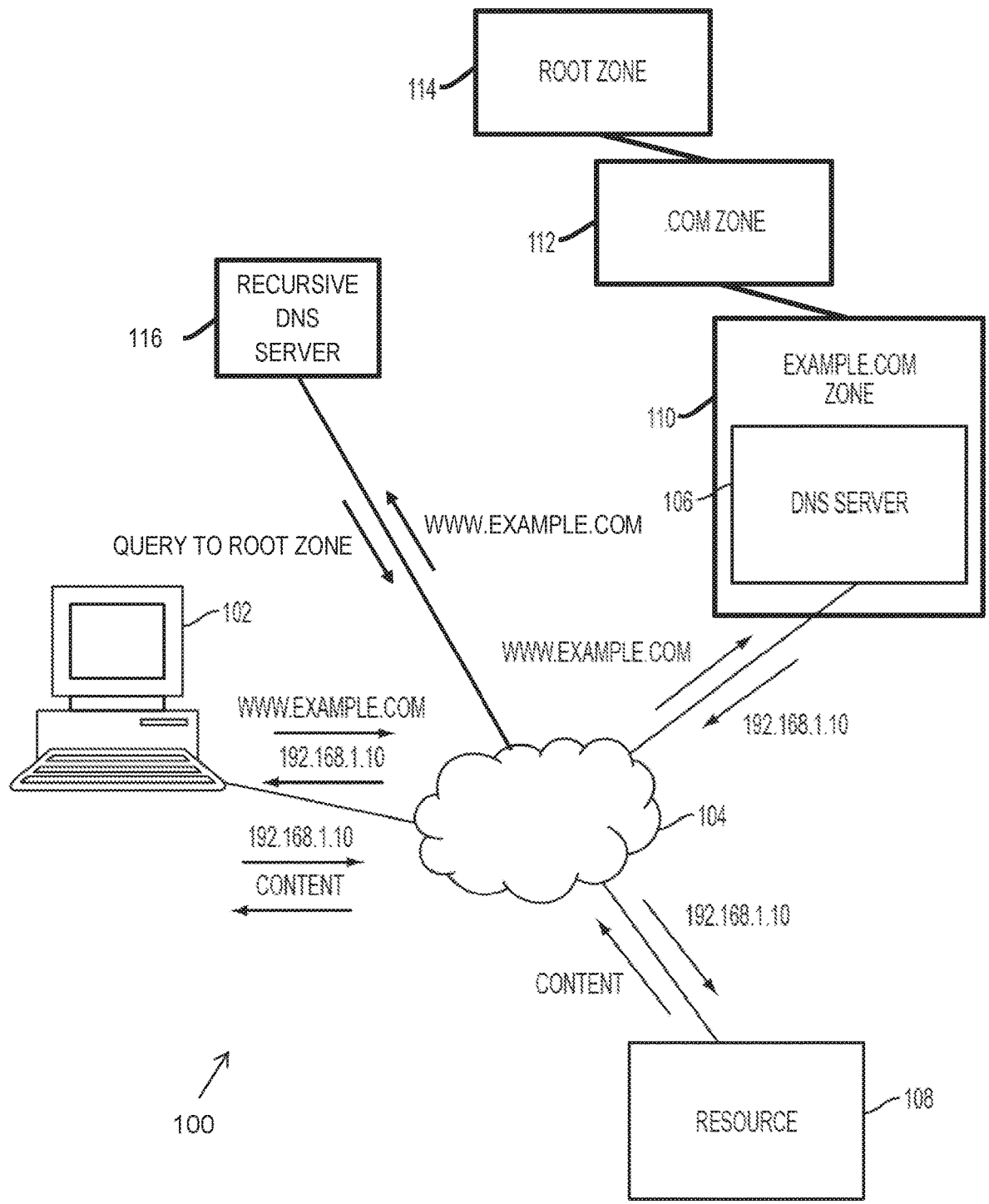
FIG. 1 is a schematic diagram illustrating a portion of the domain name system according to some embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Disclosed are techniques for implementing at least some types of post-quantum cryptography (a.k.a., "quantum-safe cryptography" or "PQC"), or more generally, improvements to cryptography considering not only the impact of quantum computing but also other cryptanalytic advances, while simplifying protocols and architectures. In more detail, PQC assumes that existing cryptographic techniques that rely on the apparent difficulty of solving certain mathematical problems are insecure unless such mathematical problems have been proven to be difficult in a technical sense. Accordingly, PQC attempts to replace existing public-key cryptosystems that are based on the difficulty of the so-called RSA problem and/or the difficulty of computing discrete logarithms, which may be vulnerable to quantum computing, for example, with infrastructure that is based on symmetric-key cryptosystems.

PQC can also include hash-based digital signatures, and associated upgrades to public-key infrastructures (PKI) to support them. PQC can also include new public-key cryptosystems that are not vulnerable to quantum computing. PQC can also include techniques to smoothly transition from today's cryptography to these new approaches. Lastly, and the subject of the present document, PQC can include symmetric-key infrastructures. Such PQC symmetric-key infrastructure may be used to secure (e.g., encrypt) a communications channel between two internet-connected computers.

PQC provides answers to the question: If conventional public-key cryptosystems are insecure or not available, how can clients and servers set up secure connections, at internet scale, with high assurance? Conventional PKI, such as RSA, Diffie-Hellman, elliptic curve, etc., is potentially at risk due to cryptanalytic advances, mathematical advances, and quantum computing. Non-conventional public-key cryptosystems (e.g., based on lattices, etc.) are not yet well enough understood to be relied upon with confidence. Furthermore, if new non-conventional public-key cryptosystems are initially deployed, there may not be sufficient interoperability among implementations. It is desirable therefore to separate the distribution of symmetric keys from their use for securing communications, hence another motivation for a symmetric-key infrastructure. Existing hash-based signatures may only support authentication, rather than encryption. Existing symmetric-key infrastructures, which were originally designed for enterprise-scale closed networks, cannot be reliably extended to operate at an internet scale. Lastly, known internet-scale extensions of existing symmetric-key infrastructures utilize public-key cryptosystems to some extent. Accordingly, there is a need for robust, secure, internet-scale symmetric-key infrastructure.

This document provides PQC in the form of a DNS-based symmetric-key infrastructure (SKI). According to some embodiments, a client computer obtains a shared symmetric key for use with a web (or other) server computer via a network of symmetric key server computers, referred to herein as "key servers". The web (or other) server that the client wishes to communicate with securely may publish names of its authoritative key servers in the DNS. According to some embodiments, a client may utilize a recursive key server in order to obtain a symmetric key for securely communicating with a web server. According to such embodiments, the recursive key server interacts with a network of key servers on the client's behalf to ensure that both the client and the web server share a common symmetric key. The client and web server then secure (e.g., encrypt) communications between them based on the shared symmetric key. (Throughout this document, "share a symmetric key" means either that two entities each have access to the same or a functionally equivalent version of the symmetric key, or to versions of the key such that one entity can perform an operation with its version of the key in one direction, e.g., wrapping or encrypting, and the other can perform an operation with its version in the reverse direction, e.g., unwrapping or decrypting. Furthermore, although for convenience, two entities may be described as sharing a specific symmetric key, the entities may share more than one symmetric key at a time, and may perform different operations with the different keys and/or keys derived from them, e.g., one key for securing communications and another key for wrapping and/or deriving keys. In addition, in some cases more than two entities may share a given key.)

FIG. 1 is a schematic diagram 100 depicting, by way of background, an example DNS interaction. Note that the interaction depicted by FIG. 1 does not necessarily involve an embodiment of the invention. Instead, FIG. 1 depicts an overview of one example of how DNS enables the internet to operate using domain names instead of numerical internet protocol (IP) addresses. That is, although networked computers generally rely on numerical locators such as IP addresses, human beings are ill-equipped to memorize such locators. Accordingly, DNS enables humans to rely on easy-to-remember domain names to access resources and data.

A user may operate client computer 102. (For ease of discussion, a client is identified with its hardware client computer unless otherwise specified or clear from context.) The user may enter a domain name, e.g., www.example. com, in the navigation field of a web browser executing on client computer 102. Client computer 102 operates and/or contacts local recursive DNS server 116 to look up the IP address corresponding to www.example.com. In particular, client computer 102 may send a resource record query to recursive DNS server 116. For purposes of this example, recursive DNS server 116 lacks a resource record for www.example.com. In general, DNS name resolution follows the DNS hierarchy, which is based on delegation of authority from one zone to the next, according to the structure of DNS names. This hierarchy has a tree structure, from root to leaves. Therefore, recursive DNS server 116 proceeds to traverse the DNS hierarchy to find a server that has the requested information as follows. According to the DNS protocol, recursive DNS server 116 may in this example query the root zone 114 for this record. By way of a DNS name server (NS) resource record, the root server points to a DNS server for .com zone 112, which provides an NS record that points to DNS server 106 for the zone 110 for www.example.com, again, relying on an NS resource record. DNS server 106 responds to recursive DNS server 116 with an appropriate DNS record (e.g., A or AAAA) that includes the requested IP address. Client computer 102 receives the resource record from recursive DNS server 116 and parses it to extract the IP address. Client computer 102 then contacts the IP address, which leads to resource 108, which may be a server computer. Resource 108 responds with the requested data, e.g., content.

The basic DNS hierarchy traversal described in this section is utilized by various embodiments for a client to obtain a symmetric key, as described in detail presently.

II. Basic DNS-Based Symmetric-Key Infrastructure

Figure 2:
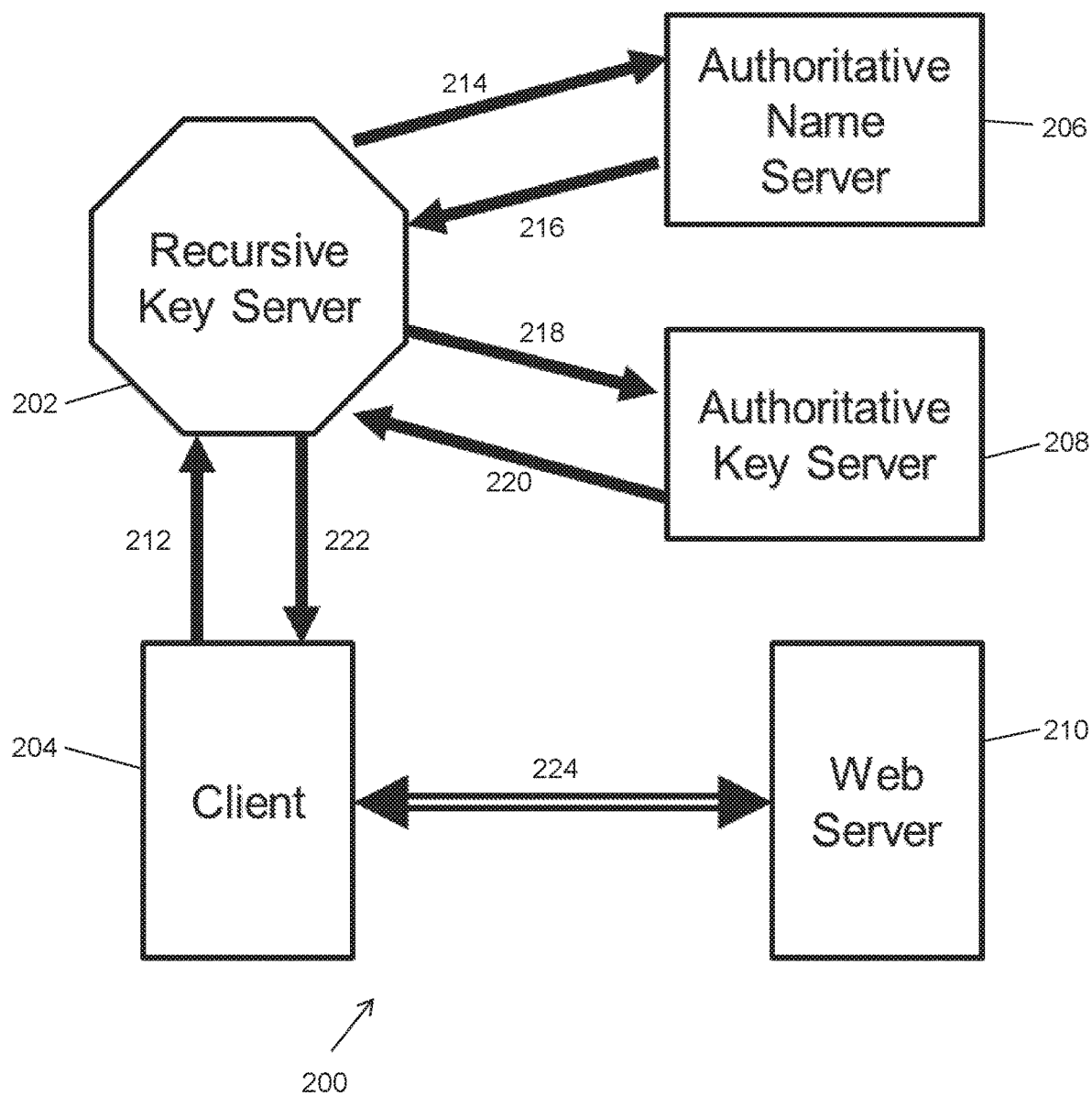
FIG. 2 is a hybrid diagram of a system for and method of implementing symmetric-key infrastructure according to some embodiments.

FIG. 2 is a hybrid diagram 200 of a system for and method of implementing symmetric-key infrastructure according to some embodiments. In particular, diagram 200 illustrates a method for distributing a symmetric key to a client and server using the DNS. Diagram 200 also depicts a system that includes recursive key server 202, client 204, authoritative name server 206, authoritative key server 208, and web server 210. Each of these entities includes an internet-connected hardware computer configured to perform operations as disclosed herein. These entities and their structures are further set forth presently and in reference to FIG. 3, below.

The method of FIG. 2 may be initiated by client 204 in order to secure communications between client 204 and web server 210. Though depicted as a web server in diagram 200, any server may benefit from the disclosed techniques, and such techniques are not limited to use with web servers. As non-limiting examples, the techniques may be employed to establish a key for securing communications between client 204 and a key server; a DNS server; an Extensible Provisioning Protocol (EPP) server; a Registration Data Access Protocol (RDAP) server; a mail server; a database; a content registry, such as a handle system registry; or a device. The techniques may also be employed to establish a key for use in securing individual objects, including email, messages, files, and cryptocurrency transactions. In addition, in some embodiments, the symmetric key may also be made accessible to additional entities, e.g., a trusted entity that may require access to communications for security purposes. The method of FIG. 2 establishes a shared, secret, symmetric key for client 204 and web server 210.

At the outset, client 204 and recursive key server 202 have previously established or have access to a symmetric key for securing a communication between them, denoted Km. (Throughout this disclosure, symmetric keys are denoted KSUBSCRIPT, where "SUBSCRIPT" includes the initials of the parties that are intended to use the key so denoted.) Thus, client 204 and recursive key server 202 can set up a secure (e.g., encrypted) connection for use in exchanging other keys. Further, at the outset, web server 210 and authoritative key server 208 have likewise previously established or have access to a symmetric key for securing a communication between them, denoted $K_{AW}$. These entities can similarly set up a secure connection for use in exchanging other keys.

Thus, the method relies on minimal set up provisions. Client 204 may only initially have a shared symmetric key $K_{CR}$ with recursive key server 202, and web server 210 may only initially have shared symmetric key $K_{AW}$ with authoritative key server 208. The key distribution network is thus bootstrapped with a small number of initial key set ups. Further, as described herein, recursive key server 202 discovers authoritative key server 208 via DNS.

The method may begin by client 204 contacting recursive web server 202 with a request for a symmetric key for use in securing communications with web server 210 at step 212. The request may be secured (e.g., encrypted) using a key derived from $K_{CR}$. (Throughout this disclosure, the phrase "secured using a key derived from key K" means encrypted using K or a key derived from K, e.g., by hashing K or combining K with one or more other keys, or using K to securely share a key that is then used to encrypt or that is used to derive a key that is used to encrypt.) The request, and all communications described herein, may be implemented as communications over the internet using existing protocols.

Next, at step 214, recursive key server 202 contacts authoritative name server 206 with a request for a key server record for web server 210. Such a key server record may be a new type of DNS resource record, which specifies a key server for a given internet-connected entity.

In general, according to some embodiments, a domain name owner may publish one or more authoritative key server resource records in the DNS, in association with the domain name, similar to other DNS record types. According to some embodiments, key server records may have a dedicated DNS resource record type, e.g., "KS", or may be implemented as service records (SRV) or uniform resource identifier (URI) records. Thus, key server records may be implemented using existing DNS record types, with no changes to DNS implementations, or as a new record type.

The key server records may be stored by a name server in the domain that the key server serves, or in a subdomain of that domain. Thus, according to some embodiments, key server records may be published in subdomains, e.g., at _ks._tcp.<domain>.

A name server may return more than one such record, if a domain has more than one key server, and the requester may choose a key server among those returned with a server selection algorithm. A requester may discover the "enclosing" key server record for a domain by implementing resolution logic at the requestor's end, for example, moving from child to parent domains. Such techniques are disclosed in U.S. Pat. No. 9,705,851, filed Jul. 31, 2015, and entitled, "Extending DNSSEC Trust Chains to Objects Outside the DNS", which is hereby incorporated by reference in its entirety. Such logic may also involve determining whether a domain has an associated public key and/or certificate (e.g., via a TLSA record) prior to and/or in addition to searching for a symmetric-key infrastructure key server associated with the domain.

A key server record may specify the domain name of the key server for the identified domain name, and possibly other information about how to connect to it. A domain name may also have hidden key servers that are not published in DNS. Note that a key server record can be associated with more than one domain, e.g., subdomains as well, or possibly an entire zone.

Thus, at step 214, recursive key server 202 requests such a key server DNS resource record from authoritative name server 206. This step can be accomplished as an ordinary DNS lookup, which may involve iteration through the DNS hierarchy (see FIG. 1 and accompanying description). The key server DNS resource record may be authenticated using DNSSEC.

Next, at step 216, authoritative name server 206 returns a key server DNS resource record to recursive key server 202. The response includes information from the key server resource record for web server 210. In particular, the information identifies authoritative key server 208 as a key server for web server 210. The response may be secured (e.g., encrypted) using a key derived from $K_{CR}$.

Next, at step 218, recursive key server 202 contacts authoritative key server 208 to request a shared symmetric key for use with web server 210. This communication may be secured (e.g., encrypted) using a key, denoted $K_{RA}$, shared between recursive key server 202 and authoritative key server 208, or with a key derived from $K_{RA}$.

Key $K_{RA}$ may be established as follows. If recursive key server 202 does not yet share a key with authoritative key server 208, e.g., it has just discovered authoritative key server 208, then recursive key server 202 requests a key from one of authoritative key server's 208 own authoritative key servers. That is, because authoritative key server 208 itself has a domain name, authoritative key server 208 can publish the names of its own key servers in the DNS. Recursive key server 202 may utilize the DNS, traversing the DNS hierarchy if necessary, to locate an authoritative DNS name server that has a key server record for authoritative key server 208. For example, if, on the one hand, recursive key server 202 shares a key with one of authoritative key server's 208 key servers, denoted here as "BKS", then recursive key server 202 can secure a connection with BKS and request a key for authoritative key server 208. (In other words, for this step in the process, recursive key server 202 and authoritative key server 208, which may not yet share a symmetric key, can temporarily take on the roles of client 204 and web server 210 respectively for the purpose of establishing such a key, via BKS, which can temporarily take on the role of authoritative key server 208.) If, on the other hand, recursive key server 202 does not share a key with any of authoritative key server's 208 key servers, then recursive key server 202 can repeat the process with the key servers of each BKS, until it finds a key server in its network, i.e., with which it shares a key. Thus, the key server resolution may utilize DNS resolution to identify key servers for domains and follow the key server graph, which is based on association of key servers with domain names. Such a graph has a directed graph structure, from an origin to a network of key servers. Advantageously, under this approach, recursive key server 202 having a single shared symmetric key with one authoritative key server in the graph of key servers transitively associated with web server 210 is sufficient to get a key for use with authoritative key server 208 (and possibly other key servers as well). It may therefore be assumed for purposes of describing the following steps that recursive key server 202 and authoritative key server 208 already share a symmetric key $K_{RA}$.

Next, at step 220, authoritative key server 208 returns to recursive key server 202 information sufficient for recursive key server 202 to obtain a symmetric key, denoted $K_{CW}$, that client 204 can use to establish a secure connection with web server 210. This information may take one of the following forms, or a combination thereof:

Secure channel: Authoritative key server 208 may generate or otherwise acquire $K_{CW}$, then send $K_{CW}$ to recursive key server 202 via a communication channel secured (e.g., encrypted) using $K_{RA}$ or a key derived from $K_{RA}$.

Key wrapping: Authoritative key server 208 may generate or otherwise acquire $K_{CW}$, then wrap $K_{CW}$ using $K_{RA}$ or a key derived from $K_{RA}$, and send the result to recursive key server 202. Denote "Wrap ($K_1$, $K_2$)" (equivalently, "wrapping $K_1$ using $K_2$") to mean the results of wrapping key $K_1$ using key $K_2$ or a key derived from $K_2$. Here "wrapping" means encrypting or otherwise securing a key in a reversible way using a wrapping key such that the key can be recovered from the results by "unwrapping" with the same wrapping key. Thus, denote $WK_{CWRA}$=Wrap ($K_{CW}$, $K_{RA}$). Authoritative key server 208 may compute $WK_{CWRA}$, then send $WK_{CWRA}$ and optionally an identifier of $K_{RA}$ or other information sufficient to determine $K_{RA}$ to recursive key server 202. Recursive key server 202 then unwraps $WK_{CWRA}$ using $K_{RA}$ or a key derived from $K_{RA}$ to obtain $K_{CW}$.

Key derivation: Authoritative key server 208 may derive $K_{CW}$ from $K_{RA}$ or a key derived from $K_{RA}$, and optional key derivation parameters. Authoritative key server 208 may send any key derivation parameters not implied by prior communications or other context, and optionally an identifier of $K_{RA}$ or other information sufficient to determine $K_{RA}$ to recursive key server 202. (In some embodiments here and elsewhere involving key derivation, one entity deriving the key, e.g., authoritative key server 208 here, may not send parameters to another, i.e., key derivation parameters may be implied from context, such as time of day, IP address, and/or domain name.) Recursive key server 202 may similarly derive $K_{CW}$ from $K_{RA}$ or a key derived from $K_{RA}$ and optionally the key derivation parameters.

Out of band: Authoritative key server 208 may generate or otherwise acquire $K_{CW}$, such that $K_{CW}$ is associated with an identifier in a separate server, e.g., an external key server, and send the identifier for $K_{CW}$ to recursive key server 202. Recursive key server 202 may then obtain $K_{CW}$ from the separate server.

Next, at step 222, recursive key server 202 returns to client 204 information sufficient for client 204 to obtain the key $K_{CW}$. This information may take one of the following forms, or a combination thereof:

Secure channel: Recursive key server 202 may send $K_{CW}$ to client 204 via a communication channel may be secured (e.g., encrypted) using $K_{CR}$ or a key derived from $K_{CR}$.

Key wrapping: Recursive key server 202 may wrap $K_{CW}$ using $K_{CR}$ or a key derived from $K_{CR}$, and send the result, i.e., $WK_{CWCR}$=Wrap ($K_{CW}$, $K_{CR}$), to client 204. Client 204 may unwrap $WK_{CWCR}$ using $K_{CR}$ or a key derived from $K_{CR}$ to obtain $K_{CW}$.

Out of band: Recursive key server 202 may send an identifier for $K_{CW}$ to client 204. Client 204 may then obtain $K_{CW}$ from a separate server.

Inasmuch as $K_{CW}$ is determined by authoritative key server 208 in the foregoing, recursive key server 202 does not have the option of generating $K_{CW}$ again itself at this point by deriving it from $K_{CR}$. For this reason, only three forms of sufficient information (secure channel, key wrapping, and out of band) are described above, but not the fourth (key derivation). However, it is possible in embodiments for authoritative key server 208 to derive $K_{CW}$ from $K_{CR}$ or a key derived from $K_{CR}$, if authoritative key server 208 has access to $K_{CR}$ or a key derived from $K_{CR}$, in which case client 204 may similarly derive $K_{CW}$. It is also possible, as shown in the following, for recursive key server 202 to determine $K_{CW}$ itself in other embodiments, in which case recursive key server 202 may derive $K_{CW}$ from $K_{CR}$ or a key derived from $K_{CR}$.

Finally, at 224, client 204 establishes a secure connection with web server 210 using $K_{CW}$ or a key derived from $K_{CW}$. Again, this means that messages sent between client 204 and web server 210 may be encrypted using $K_{CW}$ or a key derived from $K_{CW}$, or that $K_{CW}$ may be used to securely share a key that is used to encrypt such messages or derive a key that is used to encrypt such messages.

Method 200 may vary according to different embodiments. For example, at step 220, authoritative key server 208 may return more than one response to recursive key server 202, to provide more choices to recursive key server 202 (e.g., involving different previously shared keys, validity periods, key types, algorithm identifiers, key usage restrictions, policies). Recursive key server 202 may choose one such response, or may process more than one such response. At step 222, recursive key server 202 may in turn return more than one response to client 204. Client 204 may likewise choose one such response, or may process more than one such response. Finally, at step 224, client 204 may specify more than one potential key when setting up secure communications with web server 210, thus again providing more choices for negotiation. In addition, to focus the set of possible responses, a requester (e.g., client 204 or recursive key server 202) may indicate its preferences, including which keys it knows and which algorithms it supports, and/or on which entity's behalf it is requesting a key, in its request to a key server (e.g., recursive key server 202 or authoritative key server 208). Entities may also publish such preferences and/or negotiate such capabilities interactively.

III. Web Server Key Arrangements ($K_{CW}$ and $K_{AW}$)

According to some embodiments, web server 210 acquires $K_{CW}$ as follows. At 220, authoritative key server 208 returns to recursive key server 202 information sufficient for web server 210 to obtain $K_{CW}$. At 222, recursive key server 202 forwards this information to client 204. At 224, client 204 then presents this information to web server 210 when establishing a secure connection. This information may take one of the following forms, or a combination thereof:

Secure channel: Authoritative key server 208 may send $K_{CW}$ directly to web server 210 via a communication channel (not shown in FIG. 2) secured (e.g., encrypted) using $K_{AW}$ or a key derived from $K_{AW}$.

Key wrapping: Authoritative key server 208 may wrap $K_{CW}$ using $K_{AW}$ or a key derived from $K_{AW}$ and return the result, i.e., $WK_{CWAW}$=Wrap ($K_{CW}$, $K_{AW}$), and optionally an identifier of $K_{AW}$ or other information sufficient to determine $K_{AW}$, to recursive key server 202 at step 220. Recursive key server 202 then returns $WK_{CWAW}$ to client 204 at step 222. Then, when client 204 initiates a secure connection with web server 210 per step 224, client 204 also presents $WK_{CWAW}$ to web server 210. Because web server 210 has access to $K_{AW}$, web server 210 can unwrap $WK_{CWAW}$ with $K_{AW}$ or a key derived from $K_{AW}$ to recover $K_{CW}$.

Key derivation: Authoritative key server 208 may derive $K_{CW}$ from $K_{AW}$ or a key derived from $K_{AW}$, and optional key derivation parameters. Authoritative key server 208 may return any key derivation parameters not implied by prior communications or other context, and optionally an identifier of $K_{AW}$ or other information sufficient to determine $K_{AW}$ to recursive key server 202 at step 220. Recursive key server 202 may return the optional parameters and identifier to client 204 at step 222, and client 204 may in turn present the optional parameters and identifier to web server 210 at step 224. Because web server 210 has access to $K_{AW}$, web server 210 can derive $K_{CW}$.

Out of band: Authoritative key server 208 may return an identifier for $K_{CW}$ to recursive key server 202 at step 220, such that $K_{CW}$ is associated with the identifier in a server accessible to web server 210. (Authoritative key server 208 is an example of such a server.) Recursive key server 202 may return the identifier to client 204 at step 222, and client 204 may in turn present the identifier to web server 210 at step 224. Web server 210 may access the separate server to recover $K_{CW}$.

All four forms are compatible with authoritative key server 208 generating or otherwise acquiring $K_{CW}$ and wrapping it using $K_{RA}$ or a key derived from $K_{RA}$. All four forms are also compatible with authoritative key server 208 deriving $K_{CW}$ from $K_{RA}$ or a key derived from $K_{RA}$ above. The compatibility with the third form, where authoritative key server 208 derives $K_{CW}$ from both $K_{RA}$ (or a key derived from $K_{RA}$) and $K_{AW}$ (or a key derived from $K_{AW}$), may be realized by putting information derived from a key in the role of a parameter. For example, define $K_{CW}$=$KDF_1$ ($KDF_2$ ($K_{RA}$, $P_2$), $KDF_3$ ($K_{AW}$, $P_3$), $P_1$) where $KDF_1$, $KDF_2$, and $KDF_3$ denote key derivation functions, and $P_1$, $P_2$, and $P_3$ are optional parameters. Then $K_{CW}$ is derived from both $K_{RA}$ and $K_{AW}$. Now define $DK_{RA2}$=$KDF_2$ ($K_{RA}$, $P_2$) and $DK_{AW3}$=$KDF_3$ ($K_{AW}$, $P_3$). Then from the perspective of authoritative key server 208 setting up $K_{CW}$ at recursive key server 202, $K_{CW}$ is derived from $K_{RA}$ with parameters $P_2$, $DK_{AW3}$ and $P_1$: $K_{CW}$=$KDF_1$ ($KDF_2$ ($K_{RA}$, $P_2$), $DK_{AW3}$, $P_1$). However, from the perspective of authoritative key server 208 setting up $K_{CW}$ at web server 210, $K_{CW}$ is derived from $K_{AW}$ with parameters $DK_{RA2}$, $P_3$ and $P_1$: $K_{CW}$=$KDF_1$ ($DK_{RA2}$, $KDF_3$ ($K_{AW}$, $P_3$), $P_1$). Therefore, recursive key server 208 and web server 210 may each derive $K_{CW}$ itself based on a shared key ($K_{RA}$ vs. $K_{AW}$ respectively) and key derivation parameters ($P_2$, $DK_{AW3}$ and $P_1$ vs. $DK_{RA2}$, $P_3$ and $P_1$ respectively). Note that given access to the parameters $DK_{AW3}$, $DK_{RA2}$ and $P_1$, an adversary may also be able to derive $K_{CW}$. Therefore, at least one of these parameters, when conveyed between entities in FIG. 2, may be conveyed over a secure channel or otherwise protected from disclosure. For example, $DK_{AW3}$ may be conveyed over a secure channel from authoritative key server 208 to recursive key server 202.

An advantage to these approaches of providing web server 210 with shared key $K_{CW}$ is that authoritative key server 208 and web server 210 do not need to store copies of multiple keys, i.e., separate keys $K_{CW}$ shared with each client; $K_{AW}$ alone is sufficient, and $K_{AW}$ may be stored in a tamper-resistant hardware cryptographic module.

According to some embodiments, at the outset, web server 210 and authoritative key server 208 establish a symmetric key $K_{AW}$ for securing a communication between them as follows. Web server 210 obtains a shared symmetric key for use with authoritative key server 208 via the network of other key servers, e.g., starting with its own recursive key server, with web server 210 and authoritative key server 208 effectively taking the roles of client 204 and web server 210 respectively according to the key establishment steps previously described. Web server 210 initiates a secure connection with authoritative key server 208 using the shared symmetric key. Web server 210 and authoritative key server 208 may also authenticate one another via non-symmetric-key methods (certificates, hash-based signatures) such that key servers only need to be trusted for confidentiality, not authentication. Web server 210 then provisions one or more key wrapping keys (e.g., $K_{AW}$) for use by authoritative key server 208 in responding to requests for shared symmetric keys for web server 210. Web server 210 also optionally performs other key management operations over the secure connection.

Web server 210 may "bootstrap" the process just described via a key established out of band with a key server, from which it obtains keys for other key servers, ultimately reaching authoritative key server 208. Such other key servers may also include key servers operated by hardware vendors, network operators, software suppliers, application providers, devices, and users with which web server 210 has an initial relationship. As further examples, key servers involved in establishing keys may be operated by certification authorities, identity providers, domain name registrars or registries, address registrars or registries, DNS providers, web hosting providers, cloud service providers, security service providers, search engines, voice assistant services, or more generally any entity with which another entity may have a sufficiently trusted technical or business relationship. Client 204 may similarly bootstrap its key establishment with recursive key server 202 via such initial relationships of its own, and may similarly establish and manage its relationship with recursive key server 202 by the process just described for web server's 210 interaction with authoritative name server 208. Furthermore, in embodiments, recursive key server 202 and authoritative name server 208 may bootstrap, establish, and manage their relationship by similar means.

Another technique for establishing $K_{AW}$ with web server 210 and authoritative key server 208 is disclosed below in Section VIII.

IV. Keys for Multiple Clients

Note that some embodiments secure communications between client 204 and web server 210 by encrypting such communications using a key generated, derived, or otherwise acquired by recursive key server 202 rather than by authoritative key server 208. More generally, such embodiments may include recursive key server 202 setting up shared symmetric keys for multiple clients (for securing communications with web server 210) without needing to contact authoritative key server 208 each time. The method of FIG. 2 may be modified as follows to achieve these and other advantages.

Rather than a client-specific key $K_{CW}$, authoritative key server 208 generates, derives, or otherwise acquires a recursive key server-specific key $K_{RW}$ at step 220. Authoritative key server 208 then returns to recursive key server 202 information sufficient for recursive key server 202 to obtain $K_{RW}$ at step 220. Following the various forms above, authoritative key server 208 may return $K_{RW}$ over a secure channel; may wrap $K_{RW}$ using $K_{RA}$, or a key derived from $K_{RA}$, and return the wrapped key $WK_{RWRA}$=Wrap ($K_R$w, $K_{RA}$) and optionally an identifier of $K_{RA}$ or other information sufficient to determine $K_{RA}$; may derive $K_{RW}$ from $K_{RA}$ or a key derived from $K_{RA}$ and optional key derivation parameters, and return any key derivation parameters not implied by prior communications or other context, and optionally an identifier of $K_{RA}$ or other information sufficient to determine $K_{RA}$; or may return an identifier associated with $K_{RW}$, whereby recursive key server 202 obtains $K_{RW}$ out of band. In addition, in each of these forms, authoritative key server 208 returns to recursive key server 202 information sufficient for web server 210 to obtain $K_{RW}$.

Recursive key server 202 generates, derives, or otherwise acquires $K_{CW}$ itself then returns to client 204 information sufficient for client 204 to obtain $K_{CW}$ at step 222. Following the various forms above again, recursive key server 202 may return $K_{CW}$ over a secure channel; may wrap $K_{CW}$ using $K_{CR}$ or a key derived from $K_{CR}$ and return the wrapped key $WK_{CWCR}$=Wrap ($K_{CW}$, $K_{CR}$) and optionally an identifier of $K_{CR}$ or other information sufficient to determine $K_{CR}$; may derive $K_{RW}$ from $K_{CR}$ or a key derived from $K_{CR}$ and optional key derivation parameters, and return any key derivation parameters not implied by prior communications or other context, and optionally an identifier of $K_{CR}$ or other information sufficient to determine $K_{CR}$; or may return an identifier associated with $K_{RW}$, whereby client 204 obtains $K_{CW}$ out of band.

In addition, recursive key server 202 returns to client 204 information sufficient for web server 210 to obtain $K_{CW}$. This information may include the previous information sufficient for web server 210 to obtain $K_{RW}$ and additional information sufficient for web server 210 to obtain $K_{CW}$ given $K_{RW}$. Once again following the various forms, recursive key server 202 may wrap $K_{CW}$ using $K_{RW}$ or a key derived from $K_{RW}$ and return as the additional information the wrapped key $WK_{CWRW}$=Wrap ($K_{CW}$, $K_{RW}$) and optionally an identifier of $K_{RW}$ or other information sufficient to determine $K_{RW}$, may derive $K_{CW}$ from $K_{RW}$ and optional key derivation parameters, and return any key derivation parameters not implied by prior communications or other context, and optionally an identifier of $K_{RW}$ or other information sufficient to determine $K_{RW}$, or may return an identifier associated with $K_{CW}$, such that web server 210 obtains $K_{CW}$ out of band. Recursive key server 202 may derive $K_{CW}$ from both $K_{CR}$ and $K_{RW}$ by putting information derived from a key in the role of a parameter as described above in Section III.

When client 204 initiates a secure connection with web server 210 (step 224), client 204 presents information sufficient for web server 210 to obtain $K_{CW}$. Because web server 210 has access to $K_{AW}$, web server 210 can recover $K_{CW}$ by unwrapping, deriving, and/or accessing keys out of band as appropriate.

Advantageously, recursive key server 202 can cache $K_{RW}$ and information sufficient for web server 210 to obtain $K_{RW}$ and use them for requests for the same web server 210 from other clients. Recursive key server 202 may contact authoritative key server 208 for new web servers, or when the cache entry expires, similar to DNS. According to this approach, each client may still get its own $K_{CW}$ and information sufficient for web server 210 to obtain $K_{CW}$.

In both the basic symmetric-key infrastructure approach and this improved approach for multiple clients, recursive key server 202 provides to client 204 (a) information sufficient for client 204 to obtain a key $K_{CW}$ and (b) information sufficient for web server 210 to obtain the same key $K_{CW}$. Authoritative key server 208 provides to recursive key server 202, in generalized form, information sufficient for recursive key server 202 to construct the information for (a) and (b) above. Embodiments vary in terms of the use of secure communications, wrapping, derivation, and/or out-of-band access, and in terms of whether authoritative key server 208 or recursive key server 204 initially generates or otherwise acquires $K_{CW}$. Furthermore, in some embodiments, one or more such information may not be sent explicitly, e.g., in embodiments key derivation parameters may be implied from context. The embodiments described may be considered non-limiting examples of the generalized form.

V. Multiple Key Servers for Enhanced Privacy

With symmetric-key infrastructures in general, when a key server generates a symmetric key for a client, it can also decrypt traffic associated with the key. This means that a person with full access to a key server can eavesdrop on communications secured by keys produced by the key server. Therefore, for additional assurance, according to some embodiments, the client can request keys from multiple recursive key servers and then combine the keys, e.g., by a key derivation technique, concatenation, exclusive-or (XOR), or other arithmetic or logical operations. The resulting combined key may then be used to secure communications, e.g., with a web server.

Following the generalized form above, the i-th recursive key server 202 may provide to client 204 information sufficient for client 204 to obtain a component key $K_{CW(i)}$ and for web server 210 to obtain the same key $K_{CW(i)}$. Client 204 may construct a combined key from component keys $K_{CW}^{(1)}$, $K_{CW}^{(2)}$, etc. Client 204 may also present to web server 210 the information from the various recursive key servers 202 sufficient for web server 210 to obtain the various component keys $K_{CW}^{(1)}$, $K_{CW}^{(2)}$, ..., e.g., multiple wrapped keys and/or multiple key derivation parameters, as examples without limitation, to the web server with which it wants to securely communicate, and signal that the connection is to be secured based on two or more of them, rather than on a single key. Client 204 may also provide information on how to combine the component keys to form a combined key; this all together may form the information sufficient for web server 210 to obtain the symmetric key. According to such embodiments, a single recursive key server would then be unable to decrypt associated traffic on its own. According to some embodiments, a recursive key server 202 can similarly request and combine keys from multiple authoritative key servers, and then return to client 204 information sufficient for client 204 to obtain the combined key, and information sufficient for web server 210 to do the same, which may include a combination of the various forms of information described in Section III above.

VI. Key Server Referrals & Peering

Similar to DNS referrals from one authoritative name server (e.g., authoritative name server 206) to another, an authoritative key server (e.g., authoritative key server 208) may refer a requester to another authoritative key server. The response may include a domain name of another authoritative key server, and may also include a wrapped key for connecting to the other key server. Note that such referrals may be helpful when the authoritative key server is associated with multiple domains. Referrals can also reference hidden key servers not published in the DNS.

Recursive key servers (e.g., recursive key server 202) can also contact other recursive key servers to obtain keys on their behalf in a "peering" process. Such peering may helpful when one recursive key server has access to authoritative key servers that another recursive key server does not, e.g., peers may specialize in keys for specific classes of domains.

VII. Key Derivation, Wrapping, Provenance, and Updates

Key derivation and key wrapping can follow conventional approaches, e.g., Krawczyk's HKDF key derivation technique as described in Internet Engineering Task Force RFC 5869 (which may involve separate extraction and expansion functions), and the suite of Advanced Encryption Standard (AES) techniques for key wrapping, respectively. Regardless of the choices of key derivation and key wrapping techniques, such techniques may generate keys that include various parameters, e.g., so as to specify any, or a combination, of key generation method, key origin, key server name, web server name, client identifier, counter, nonce, validity period, key identifier, key type, algorithm identifier, key usage restrictions, or policies. In key wrapping, some parameters may be wrapped along with the key for confidentiality, if supported by the key wrapping technique. Including such parameters in can also provide provenance for the various keys, e.g., the web server can determine information about the origin and management of the keys presented to it, including the identity of the path through the key server graph, to decide whether to continue the connection accordingly.

Various entities, such as recursive and/or authoritative key servers, may set and enforce policies that govern key derivation. An example of such a policy states that keys must be derived from multiple entities' contributions. A web server and/or key server may refuse connections that require keys that do not meet such policies. Recursive key servers may offer policy-specific services, and a client may choose a recursive key server and/or specify requests according to the client's preferred policy. Examples of such arrangements are disclosed in U.S. patent application Ser. No. 14/627,506, filed Feb. 20, 2015, and entitled, "Balancing Visibility in DNS", which is hereby incorporated by reference in its entirety. Policies may also specify constraints on locations of key servers, relationships (e.g., independence from a specified entity or entities), and other attributes. Thus, a client's key server selection may be based on policy as well as performance (latency, availability, etc.).

Keys may be updated (e.g., replaced) based on their probable frequencies of use and on security considerations. In general, "operational" keys generated by key servers in response to requests can have a short validity period (e.g., measured in minutes or hours, less than one day) and then expire. This reduces potential exposure and simplifies key management because such keys are essentially continually refreshed. "Infrastructure" keys established initially between entities, e.g., between a client and its recursive key server, or between a web server and its authoritative key server, may have a relatively longer validity period, in days, or weeks, in some cases. However, such keys can also be refreshed, via a policy requiring a new key to be obtained periodically over a secure connection. Keys can also be updated in place in some implementations, e.g., via key derivation of a new key from an old one. Initial setup operations can also be applied again to manage and/or change keys.

VIII. Symmetric Key Pairs

In the foregoing, each entity may store certain symmetric keys that it shares with other entities for a time period spanning multiple transactions, e.g., client 204 and recursive key server 202 each store $K_{CR}$, recursive key server 202 and authoritative key server 208 each store $K_{RA}$, and authoritative key server 208 and web server 210 each store $K_{AW}$. Certain other symmetric keys may only be held within a transaction (e.g., for the duration of the transaction, as required for the transaction, or until used by the transaction). For example, client 204, recursive key server 202, authoritative key server 208 and web server may each hold $K_{CW}$ within a transaction; the key may not need to be stored for multiple transactions because it can be obtained from the other stored keys, and from information on how to obtain the key from the other stored keys.

In implementations where one entity shares keys with a large number of other entities, e.g., where recursive key server 202 interacts with many clients 204, where authoritative key server 208 interacts with many recursive key servers 202 (or vice versa), and/or where authoritative key server interacts with many web servers 210, it may not be practical for the entity to store all of the symmetric keys that it shares in an efficient and secure manner. In such situations, an alternative is for the entity to provide to a corresponding entity information sufficient to obtain a shared symmetric key from a symmetric key that the entity does store (and which may not be a shared key, i.e., it may be local to the entity). For example, recursive key server 202 may provide to client 204 a wrapped key $WK_{CRRR}$=Wrap ($K_{CR}$, $K_{RR}$), where $K_{CR}$ is a symmetric key shared between the entities and $K_{RR}$ is a symmetric key local to recursive key server 202. When establishing a secure communication with recursive key server 202, client 204 may present, in addition to other information, the wrapped key $WK_{CRRR}$. Notably, recursive key server may be able to obtain a specific client's $K_{CR}$ from $WK_{CRRR}$ and would not need to store $K_{CR}$ for every client, only the local key $K_{RR}$. Similar arrangements may be made between recursive key server 202 and authoritative key server 208, based on wrapped keys $WK_{RARR}$=Wrap ($K_{RA}$, $K_{RR}$) and/or $WK_{RAAA}$=Wrap ($K_{RA}$, $K_{AA}$); and between authoritative key server 208 and web server 210, based on wrapped keys $WK_{AWAA}$=Wrap ($K_{AW}$, $K_{AA}$) and/or $WK_{AWWW}$=Wrap ($K_{AW}$, $K_{WW}$). Alternatively, instead of wrapping, the key management can be optimized through key derivation. For example, recursive key server 202 may derive $K_{CR}$ from local key $K_{RR}$ and key derivation parameters, and provide the key derivation parameters to client 204, rather than storing $K_{CR}$. Client 204 may then present the key derivation parameters (if not already implied by prior communications or other context) when establishing secure communication with recursive key server 202. The examples for other entities are similar.

When two wrapped keys such as $WK_{AWAA}$=Wrap ($K_{AW}$, $K_{AA}$) and $WK_{AWAA}$=Wrap ($K_{AW}$, $K_{WW}$) are prepared, the combination may be considered a "symmetric key pair." Symmetric key pairs as disclosed may be used to establish $K_{AW}$ with web server 210 and authoritative key server 208 as follows. In general, a domain name owner may provide a symmetric key pair as a "hint" along with a key server record. For example, web server 210 may publish $WK_{AWAA}$ and $WK_{AWWW}$ in conjunction with a key server record for authoritative key server 208. Authoritative key server 208 would not need to look up, or even store, $K_{AW}$. Instead, a requester such as client 204 or recursive name server 202 may present $WK_{AWAA}$, and authoritative key server 208 may unwrap it with local key $K_{CR}$, to get $K_{AW}$. Authoritative key server 208 may also forward $WK_{AWWW}$ to the requester, if the requester does not already have it from the hint. This value may eventually be presented to web server 210 by the requestor, so that web server 210 may unwrap it with local key $K_{WW}$ and would not need to look up or store $K_{AW}$.

IX. Example Implementation Hardware and Data Structures

Figure 3:
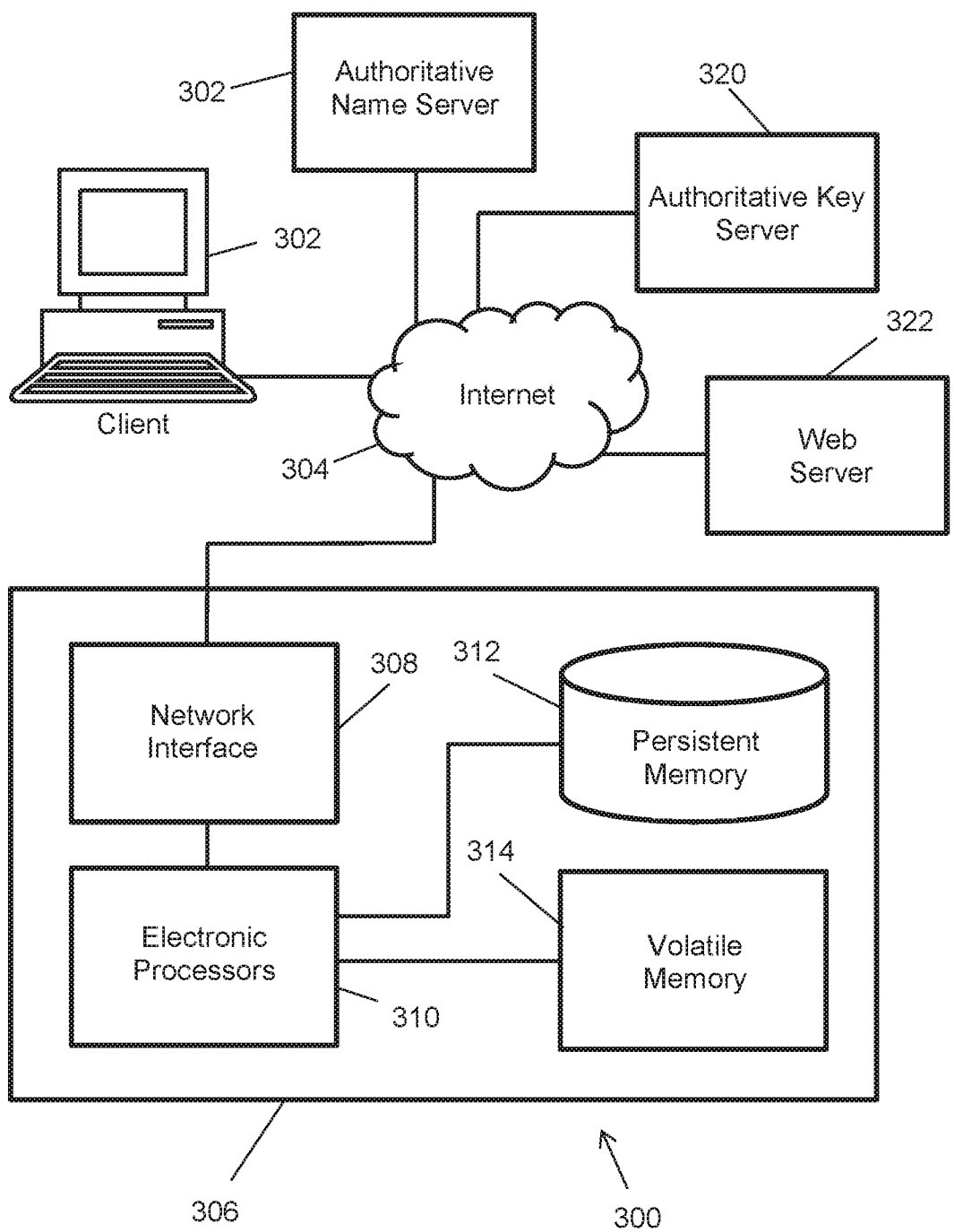
FIG. 3 is a schematic diagram of a system suitable for implementing methods according to some embodiments.

FIG. 3 is a schematic diagram of a system 300 suitable for implementing methods according to some embodiments. System 300 may be based around an electronic hardware internet server computer 306, which may be communicatively coupled to the internet 304. Server computer 306 includes network interface 308 to effect the communicative coupling to the internet 304. Network interface 308 may include a physical network interface, such as a network adapter. Server computer 306 may be a special-purpose computer, adapted for reliability and high-bandwidth communications. Thus, server computer 306 may be embodied in a cluster of individual hardware server computers, for example. Alternately, or in addition, server computer 306 may include redundant power supplies. Persistent memory 312 may be in a Redundant Array of Inexpensive Disk drives (RAID) configuration for added reliability, and volatile memory 314 may be or include Error-Correcting Code (ECC) memory hardware devices. Server computer 306 further includes one or more electronic processors 310, which may be multi-core processors suitable for handling large amounts of information. Electronic processors 310 are communicatively coupled to volatile memory 314. Electronic processors 310 are also communicatively coupled to persistent memory 312, and may execute instructions stored thereon to effectuate the techniques disclosed herein, e.g., the techniques shown and described in reference to FIG. 2. In particular, server computer 306 may embody a recursive key server such as recursive key server 202 of FIG. 2. Server computer 306 is further communicatively coupled to DNS authoritative name server 302, authoritative key server 320, web server 322, and client computer 302 through internet 304, such that it may effectuate the disclosed techniques.

Some embodiments utilize hardware cryptographic modules. Such cryptographic modules may securely store one or more keys and securely implement key operations such as encryption, decryption, key derivation, key wrapping, and key unwrapping. They may be removably communicatively coupled to hardware computers, e.g., by insertion into an expansion slot. They may be compliant with Federal Information Processing Standards, Publication 140-2, "Security Requirements for Cryptographic Modules" (a.k.a., "FIPS PUB 140-2"). They may have tamper resistant and/or tamper evident properties.

Key servers such as recursive key server 202 and authoritative key server 208 may include a special-purpose DNS interface, e.g., DNS over HTTPS, with JSON encoding of responses, that responds only to specially defined key requests, and leverages existing and emerging functionality. Alternatively, a new DNS record type (e.g., a "K" record) may be defined for compatibility with existing encodings. The record may include information sufficient for a requester to obtain, and information for a server to obtain, a shared symmetric key, as well as other parameters such as a key identifier, a key type, an algorithm identifier, a priority, and a time to live (TTL). The information sufficient for the requester and/or the server to obtain the symmetric key may include a data structure with fields such a wrapped key, key derivation parameters, and identifiers for other keys involved in wrapping and/or derivation. Alternatively, the information may include a programming script with instructions for constructing the key. As another alternative, the information may include one or more DNS records of the new key record type, each record indicating how to construct a key from one or more other keys, e.g., through unwrapping, derivation, extraction, expansion, concatenation, and/or other combination. Following the DNS protocol, some key records may be returned in the "answer" section and others in the "additional" section of a DNS response. A key server may indicate to a requester, explicitly or implicitly, which such key records will enable the requester to construct a targeted key, and which such key records will enable another entity, e.g., a web server, to construct the same key. For example, a "K" record may include a key identifier or a reference to another "K" record. The requester may then forward the latter such records to the other entity. A requester may combine data structures, scripts, and/or DNS records received from more than one key server, and add further fields, instructions, and/or DNS records to form new information for constructing a combined key. A key server may return more than one response by returning more than one record, consistent with the DNS protocol. A requester may also indicate its preferences and policies in an Extension Mechanisms for DNS (EDNS) extension. Key servers so equipped are compatible with the combined key server and name server embodiments described below in Section XI.

Connections to key servers and web servers may be secured using transport layer security (TLS) pre-shared keys, with a new profile using wrapped or derived keys. The information sufficient for the server to obtain the pre-shared key may thus be provided, in some form, as the "identity" for the pre-shared key in the TLS handshake. Such an arrangement does not affect the TLS protocol, only key management, and its impact can be limited to implementations of the handshake portion of the TLS protocol, which may be separate from an implementation of the record portion that secures ongoing communications.

X. Key Pre-Generation and Wrapping

To reduce risk of compromise of keys used for wrapping, e.g., $K_{AW}$, a key server provisioning system may pre-generate a set of symmetric keys, e.g., $K_{XW}^{(1)}, \ldots, K_{XW}^{(N)}$, where X may be R (for sharing with a recursive key server) or C (for sharing with a client), pre-wrap them, $K_{XWAW}^{(1)}, \ldots, K_{XWAW}^{(N)}$, using $K_{AW}$, and provision them to a key server, instead of sending a copy of $K_{AW}$. Such a key server provisioning system may be implemented as a separate internet-connected computer, e.g., as a web service. If the key server so provisioned is compromised, only keys already provisioned may be reported and/or revoked. Such a key server may thus be set up such that it cannot generate additional wrapped keys $K_{XWAW}^{(1)}, \ldots, K_{XWAW}^{(N)}$ itself, and must therefore rely on the key server provisioning system, yet can respond to a limited number of requests from recursive key servers and/or clients with keys and associated wrapped keys. Alternatively, instead of wrapping, the key management can be optimized through key derivation. In this case, the key server provisioning system may pre-generate the symmetric keys by deriving them from $K_{AW}$ and key derivation parameters, and provision the key derivation parameters and the derived keys to the key server. The key server can then respond to a limited number of requests with derived keys and associated key derivation parameters. With these approaches, because $K_{AW}$ itself is not provided to the key server, the key server and the provisioning system may share a different symmetric key for use in securing their communications.

Each key server of a web server may be given its own shared symmetric key to use on behalf of a particular web server. Such an arrangement may be set up by a web server with each key server directly, or with groups of related key servers, where a provisioning system for a group is given a separate key, and in turn establishes keys for servers within the group via an additional level of keys, e.g., with additional key wrapping and/or key derivation.

XI. Other Modification and Variations

The symmetric-key infrastructure disclosed herein relates to traffic encryption (and integrity protection) and associated key management. Entities are effectively authenticated "transitively" by a network of key servers, to the extent they are identified and authenticated at all. However, key servers can in principle impersonate entities they share a symmetric key with, hence the benefit of combining keys from multiple key servers as described above in Section V, above. If additional assurance is needed, identity management, authentication, authorization, certification, etc., can be handled by digital signatures, e.g., hash-based signatures in a post-quantum setting, which are not necessarily part of a symmetric-key infrastructure. For example, web servers and key servers (and even clients) can have conventional public-key certificates, associating their identity with a digital signature public key. Entities can then authenticate key set up and transactions with a hash-based digital signature. This can help protect against "man-in-the-middle" attacks and key server compromise. Furthermore, although the methods described herein are motivated by the potential risks in conventional public-key cryptography, the methods may nevertheless be combined with conventional or newer forms of public-key cryptography. For example, secure connections among entities may be established using a shared symmetric key in combination with public-key cryptography methods such as those that provide forward secrecy, or as an additional layer to public-key cryptography methods.

According to some embodiments, key server and DNS name server functionality may be combined in one integrated system. Such a combination may simplify interfaces, among other advantages. For example, recursive DNS server 116 may be extended to accept requests for keys as disclosed herein, so that a client computer may ask for both a key and the IP address of a particular web server at the same time. Recursive DNS server 116 may thus embody the functionality of recursive key server 202. Authoritative DNS server 106 may likewise be extended to accept requests for keys as disclosed herein and may thus embody the functionality of authoritative key server 208. Combining functionality may make it easier to add key server functionality into existing DNS implementations.

According to some embodiments, client 204 interacts directly with authoritative key server 208 instead of via recursive key server 202. In such embodiments, the communications 212, 222 between client 204 and recursive key server 202 are omitted or internal to client 204, the communications 218, 220 between recursive key server 202 and authoritative key server 208 are instead between client 204 and authoritative key server 208, and the communications 214, 216 between recursive key server 202 and authoritative name server 206 are instead between client 204 and authoritative name server 206. Furthermore, according to some embodiments, web server 210 may take the role of recursive key server 202 and/or interact with authoritative name servers 206, authoritative key servers 208 and/or one or more other recursive key servers on behalf of client 204. Such an approach may be advantageous as web server 210 may prefetch information sufficient for client 204 to establish a symmetric key with another web server linked from a web page presented by web server 210, thereby potentially reducing latency compared to client 204 obtaining the key only after receiving the web page.

Certain embodiments can be performed using a computer program or set of programs. The computer programs can exist in a variety of forms both active and inactive. For example, the computer programs can exist as software program(s) included of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of distributing a symmetric key using a Domain Name System (DNS) including:

receiving, at a first key server and from a first computer, a request for first information sufficient for the first computer to obtain, and second information sufficient for a second computer to obtain, a symmetric key for securing at least one communication sent from the first computer to the second computer;

requesting, by the first key server, and from the DNS, a DNS resource record identifying a second key server for the second computer;

requesting, by the first key server and from the second key server, third information sufficient for the first key server to construct the first information sufficient for the first computer to obtain, and the second information sufficient for the second computer to obtain, the symmetric key for securing at least one communication sent from the first computer to the second computer;

obtaining, by the first key server and from the second key server, the third information sufficient for the first key server to construct the first information sufficient for the first computer to obtain, and the second information sufficient for the second computer to obtain, the symmetric key for securing at least one communication sent from the first computer to the second computer; and providing, by the first key server and to the first computer, the first information sufficient for the first computer to obtain, and the second information sufficient for the second computer to obtain, the symmetric key for securing at least one communication sent from the first computer to the second computer.

2. The method of claim 1, wherein the third information sufficient for the first key server to construct the first information sufficient for the first computer to obtain, and the second information sufficient for the second computer to obtain, the symmetric key for securing at least one communication sent from the first computer to the second computer includes the second information sufficient for the second computer to obtain, and fourth information sufficient for the first key server to obtain, the symmetric key for securing at least one communication sent from the first computer to the second computer, the method further including:

computing, by the first key server, the symmetric key for securing at least one communication sent from the first computer to the second computer from the fourth information sufficient for the first key server to obtain the symmetric key for securing at least one communication sent from the first computer to the second computer; and constructing, by the first key server, the first information sufficient for the first computer to obtain the symmetric key for securing at least one communication sent from the first computer to the second computer.

3. The method of claim 1, wherein the third information sufficient for the first key server to construct the first information sufficient for the first computer to obtain, and the second information sufficient for the second computer to obtain, the symmetric key for securing at least one communication sent from the first computer to the second computer includes fifth information sufficient for the first key server to obtain, and sixth information sufficient for the second computer to obtain, a second symmetric key for securing at least one communication sent from the first key server to the second computer via the first computer, the method further including:
- computing, by the first key server, the second symmetric key for securing at least one communication sent from the first key server to the second computer via the first computer from the fifth information sufficient for the first key server to obtain the symmetric key for securing at least one communication sent from the first key server to the second computer via the first computer;
- preparing, by the first key server, the symmetric key for securing at least one communication sent from the first computer to the second computer;
- constructing, by the first key server, the first information sufficient for the first computer to obtain the symmetric key for securing at least one communication sent from the first computer to the second computer; and
- constructing, by the first key server, seventh information sufficient for the second computer to obtain the symmetric key for securing at least one communication sent from the first computer to the second computer given the second symmetric key for securing at least one communication sent from the first key server to the second computer via the first computer;
- wherein the second information sufficient for the second computer to obtain the symmetric key for securing at least one communication sent from the first computer to the second computer includes the sixth information sufficient for the second computer to obtain the second symmetric key for securing at least one communication sent from the first key server to the second computer via the first computer and the seventh information sufficient for the second computer to obtain the symmetric key for securing at least one communication sent from the first computer to the second computer given the second symmetric key for securing at least one communication sent from the first key server to the second computer via the first computer.

4. The method of claim 3, further including:
- storing, by the first key server, the sixth information sufficient for the second computer to obtain the second symmetric key for securing at least one communication sent from the first key server to the second computer via the first computer;
- receiving, at the first key server and from a third computer, a request for eighth information sufficient for the third computer to obtain, and ninth information sufficient for the second computer to obtain, a third symmetric key for securing at least one communication sent from the third computer to the second computer; and
- providing, by the first key server and to the third computer, at least the sixth information sufficient for the second computer to obtain the symmetric key for securing at least one communication sent from the first key server to the second computer.

5. The method of claim 3, wherein the constructing the first information and the constructing the seventh information is performed within a tamper resistant hardware cryptographic module.

6. The method of claim 1, wherein the requesting, by the first key server, and from the DNS, the DNS resource record identifying the second key server for the second computer includes interacting with multiple DNS name servers in a portion of a DNS hierarchy.

7. The method of claim 3, wherein the constructing, by the first key server, the first information sufficient for the first computer to obtain the symmetric key for securing at least one communication sent from the first computer to the second computer, includes wrapping the symmetric key for securing at least one communication sent from the first computer to the second computer using a second symmetric key for securing at least one communication sent from the first key server to the first computer, and wherein the first information sufficient for the first computer to obtain the symmetric key for securing at least one communication sent from the first computer to the second computer includes the wrapped key.

8. The method of claim 3, wherein the constructing, by the first key server, the seventh information sufficient for the second computer to obtain the symmetric key for securing at least one communication sent from the first computer to the second computer given the symmetric key for securing at least one communication sent from the first key server to the second computer via the first computer, includes wrapping the symmetric key for securing at least one communication sent from the first computer to the second computer using the symmetric key for securing at least one communication sent from the first key server to the second computer via the first computer, and wherein the seventh information sufficient for the second computer to obtain the symmetric key for securing at least one communication sent from the first computer to the second computer given the symmetric key for securing at least one communication sent from the first key server to the second computer via the first computer includes the wrapped key.

9. The method of claim 3, wherein the preparing, by the first key server, the symmetric key for securing at least one communication sent from the first computer to the second computer, includes deriving the symmetric key for securing at least one communication sent from the first computer to the second computer from a second symmetric key for securing at least one communication sent from the first key server to the first computer and at least one key derivation parameter, wherein the first information sufficient for the first computer to obtain the symmetric key for securing at least one communication sent from the first computer to the second computer includes the at least one key derivation parameter.

10. The method of claim 3, wherein the preparing, by the first key server, the symmetric key for securing at least one communication sent from the first computer to the second computer, includes deriving the symmetric key for securing at least one communication sent from the first computer to the second computer from the symmetric key for securing at least one communication sent from the first key server to the second computer via the first computer and at least one key derivation parameter, wherein the seventh information sufficient for the second computer to obtain the symmetric key for securing at least one communication sent from the first computer to the second computer given the symmetric key for securing at least one communication sent from the first key server to the second computer via the first computer includes the at least one key derivation parameter.

11. The method of claim 1, further including:
- requesting, by the first key server and from the DNS, a second DNS resource record identifying a key server for the second key server; and
- obtaining, by the first key server and from the key server for the second key server, a second symmetric key for securing at least one communication sent from the first key server to the second key server.

12. The method of claim 1, wherein the first key server is one of a plurality of key servers from which the first computer obtains a symmetric key for securing at least one communication sent from the first computer to the second computer, whereby the first computer obtains a plurality of symmetric keys for securing at least one communication sent from the first computer to the second computer, whereby the first computer obtains an encryption symmetric key by combining the plurality of symmetric keys for securing at least one communication sent from the first computer to the second computer.

13. The method of claim 1, wherein the second computer is a DNS server computer.

14. The method of claim 1, wherein the first key server includes a DNS name server.

15. A system for distributing a symmetric key using a Domain Name System (DNS), the system including a first key server including at least one electronic hardware server computer communicatively coupled to the internet and configured to perform a method including:
 receiving, at the first key server and from a first computer, a request for first information sufficient for the first computer to obtain, and second information sufficient for a second computer to obtain, a symmetric key for securing at least one communication sent from the first computer to the second computer;
 requesting, by the first key server, and from the DNS, a DNS resource record identifying a second key server for the second computer;
 requesting, by the first key server and from the second key server, third information sufficient for the first key server to construct the first information sufficient for the first computer to obtain, and the second information sufficient for the second computer to obtain, the symmetric key for securing at least one communication sent from the first computer to the second computer;
 obtaining, by the first key server and from the second key server, the third information sufficient for the first key server to construct the first information sufficient for the first computer to obtain, and the second information sufficient for the second computer to obtain, the symmetric key for securing at least one communication sent from the first computer to the second computer; and
 providing, by the first key server and to the first computer, the first information sufficient for the first computer to obtain, and the second information sufficient for the second computer to obtain, the symmetric key for securing at least one communication sent from the first computer to the second computer.

16. The system of claim 15, wherein the third information sufficient for the first key server to construct the first information sufficient for the first computer to obtain, and the second information sufficient for the second computer to obtain, the symmetric key for securing at least one communication sent from the first computer to the second computer includes the second information sufficient for the second computer to obtain, and fourth information sufficient for the first key server to obtain, the symmetric key for securing at least one communication sent from the first computer to the second computer;
 wherein the first key server is further configured to perform:
 computing the symmetric key for securing at least one communication sent from the first computer to the second computer from the fourth information sufficient for the first key server to obtain the symmetric key for securing at least one communication sent from the first computer to the second computer; and
 constructing the first information sufficient for the first computer to obtain the symmetric key for securing at least one communication sent from the first computer to the second computer.

17. The system of claim 15, wherein the third information sufficient for the first key server to construct the first information sufficient for the first computer to obtain, and the second information sufficient for the second computer to obtain, the symmetric key for securing at least one communication sent from the first computer to the second computer includes fifth information sufficient for the first key server to obtain, and sixth information sufficient for the second computer to obtain, a second symmetric key for securing at least one communication sent from the first key server to the second computer via the first computer;
 wherein the first key server is further configured to perform:
 computing the second symmetric key for securing at least one communication sent from the first key server to the second computer via the first computer from the fifth information sufficient for the first key server to obtain the symmetric key for securing at least one communication sent from the first key server to the second computer via the first computer;
 preparing the symmetric key for securing at least one communication sent from the first computer to the second computer;
 constructing the first information sufficient for the first computer to obtain the symmetric key for securing at least one communication sent from the first computer to the second computer; and
 constructing seventh information sufficient for the second computer to obtain the symmetric key for securing at least one communication sent from the first computer to the second computer given the second symmetric key for securing at least one communication sent from the first key server to the second computer via the first computer;
 wherein the second information sufficient for the second computer to obtain the symmetric key for securing at least one communication sent from the first computer to the second computer includes the sixth information sufficient for the second computer to obtain the second symmetric key for securing at least one communication sent from the first key server to the second computer via the first computer and the seventh information sufficient for the second computer to obtain the symmetric key for securing at least one communication sent from the first computer to the second computer given the second symmetric key for securing at least one communication sent from the first key server to the second computer via the first computer.

18. The system of claim 17, wherein the first key server is further configured to perform:
 storing the sixth information sufficient for the second computer to obtain the second symmetric key for securing at least one communication sent from the first key server to the second computer via the first computer;
 receiving, from a third computer, a request for eighth information sufficient for the third computer to obtain, and ninth information sufficient for the second computer to obtain, a third symmetric key for securing at least one communication sent from the third computer to the second computer; and providing, to the third computer, at least the sixth information sufficient for the second computer to obtain the symmetric key for securing at least one communication sent from the first key server to the second computer.

19. The system of claim 17, further including a tamper resistant hardware cryptographic module, wherein the constructing the first information and the constructing the seventh information is performed within the tamper resistant hardware cryptographic module.

20. The system of claim 15, wherein the requesting, from the DNS, the DNS resource record identifying the second key server for the second computer includes interacting with multiple DNS name servers in a portion of a DNS hierarchy.

21. The system of claim 17, wherein the constructing the first information sufficient for the first computer to obtain the symmetric key for securing at least one communication sent from the first computer to the second computer, includes wrapping the symmetric key for securing at least one communication sent from the first computer to the second computer using a second symmetric key for securing at least one communication sent from the first key server to the first computer, and wherein the first information sufficient for the first computer to obtain the symmetric key for securing at least one communication sent from the first computer to the second computer includes the wrapped key.

22. The system of claim 17, wherein the constructing the seventh information sufficient for the second computer to obtain the symmetric key for securing at least one communication sent from the first computer to the second computer given the symmetric key for securing at least one communication sent from the first key server to the second computer via the first computer, includes wrapping the symmetric key for securing at least one communication sent from the first computer to the second computer using the symmetric key for securing at least one communication sent from the first key server to the second computer via the first computer, and wherein the seventh information sufficient for the second computer to obtain the symmetric key for securing at least one communication sent from the first computer to the second computer given the symmetric key for securing at least one communication sent from the first key server to the second computer via the first computer includes the wrapped key.

23. The system of claim 17, wherein the preparing the symmetric key for securing at least one communication sent from the first computer to the second computer includes deriving the symmetric key for securing at least one communication sent from the first computer to the second computer from a second symmetric key for securing at least one communication sent from the first key server to the first computer and at least one key derivation parameter, wherein the first information sufficient for the first computer to obtain the symmetric key for securing at least one communication sent from the first computer to the second computer includes the at least one key derivation parameter.

24. The system of claim 17, wherein the preparing the symmetric key for securing at least one communication sent from the first computer to the second computer, includes deriving the symmetric key for securing at least one communication sent from the first computer to the second computer from the symmetric key for securing at least one communication sent from the first key server to the second computer via the first computer and at least one key derivation parameter, wherein the seventh information sufficient for the second computer to obtain the symmetric key for securing at least one communication sent from the first computer to the second computer given the symmetric key for securing at least one communication sent from the first key server to the second computer via the first computer includes the at least one key derivation parameter.

25. The system of claim 17, wherein the first key server is further configured to perform:
   requesting, from the DNS, a second DNS resource record identifying a key server for the second key server; and
   obtaining, from the key server for the second key server, a second symmetric key for securing at least one communication sent from the first key server to the second key server.

26. The system of claim 15, wherein the first key server is one of a plurality of key servers from which the first computer obtains a symmetric key for securing at least one communication sent from the first computer to the second computer, whereby the first computer obtains a plurality of symmetric keys for securing at least one communication sent from the first computer to the second computer, whereby the first computer obtains an encryption symmetric key by combining the plurality of symmetric keys for securing at least one communication sent from the first computer to the second computer.

27. The system of claim 15, wherein the second computer is a DNS server computer.

28. The system of claim 15, wherein the first key server includes a DNS name server.

* * * * *